(12) United States Patent
Mao

(10) Patent No.: US 8,776,827 B2
(45) Date of Patent: Jul. 15, 2014

(54) HOUSEHOLD TAP WATER MONITOR

(75) Inventor: Lianhua Mao, Xiamen (CN)

(73) Assignee: Harda (Xiamen) Plastic Co., Ltd., Xiamen, Fujian (CN)

( * ) Notice: Subject to any disclaimer, the term of this patent is extended or adjusted under 35 U.S.C. 154(b) by 0 days.

(21) Appl. No.: 13/382,856

(22) PCT Filed: Apr. 19, 2011

(86) PCT No.: PCT/CN2011/072980
§ 371 (c)(1),
(2), (4) Date: Jan. 6, 2012

(87) PCT Pub. No.: WO2011/134363
PCT Pub. Date: Nov. 3, 2011

(65) Prior Publication Data
US 2013/0032228 A1  Feb. 7, 2013

(30) Foreign Application Priority Data
Apr. 30, 2010  (CN) ........................ 2010 2 0177236 U

(51) Int. Cl.
*F16K 17/00* (2006.01)
(52) U.S. Cl.
USPC .... 137/460; 137/487.5; 137/553; 137/624.12
(58) Field of Classification Search
CPC ..... F16K 17/20; F16K 37/00; F16K 37/0075; G05D 7/0635
USPC ............ 137/487.5, 624.11, 624.12, 460, 551, 137/553; 251/68
See application file for complete search history.

(56) References Cited

U.S. PATENT DOCUMENTS

| 5,409,037 | A  | * | 4/1995  | Wheeler et al. | 137/551   |
|-----------|----|---|---------|----------------|-----------|
| 5,427,350 | A  | * | 6/1995  | Rinkewich      | 251/30.01 |
| 5,479,338 | A  | * | 12/1995 | Ericksen et al.| 700/16    |
| 5,782,263 | A  | * | 7/1998  | Isaacson et al.| 137/487.5 |
| 6,119,720 | A  | * | 9/2000  | Isaacson et al.| 137/459   |
| 6,209,576 | B1 | * | 4/2001  | Davis          | 137/487.5 |
| 6,837,271 | B1 | * | 1/2005  | Saint          | 137/624.12|
| 7,451,777 | B2 | * | 11/2008 | Burlage et al. | 137/1     |
| 7,549,322 | B2 | * | 6/2009  | Kaplan         | 73/49.1   |
| 7,928,745 | B2 | * | 4/2011  | Qin et al.     | 324/750.02|
| 7,994,927 | B2 | * | 8/2011  | Atassi         | 340/609   |
| 2006/0027267 | A1 | * | 2/2006 | Fritze        | 137/487.5 |

* cited by examiner

Primary Examiner — Eric Keasel
Assistant Examiner — Jessica Cahill

(57) ABSTRACT

A household tap water monitor includes a water meter, an electrical control valve, a single chip micyoco, an LCD, an electrical source circuit, a photoelectric detector connected to a first input port of the SCM, a reset switch connected to a second input port of the SCM and a keyboard connected to a third input port of the SCM. The water meter and the electrical control valve are connected in series between a tap water pipe and a main tap water inlet pipe. A control port of the electrical control valve is connected to a first output port of the SCM, and the LCD is connected to a second output port of the SCM. The photoelectric detector is used for monitoring the rotation of a small impeller in the water meter. The electrical source circuit is used to supply electricity for the components mentioned above.

2 Claims, 6 Drawing Sheets

HOUSEHOLD TAP WATER MONITOR

BACKGROUND OF THE INVENTION

1. Field of the Invention

The present invention relates to an auxiliary device for a tap water pipe, and more particularly to a household tap water monitor to prevent the tap water pipe from leaking.

2. Description of the Prior Art

In general, a water meter and a valve are connected in series between a tap water pipe and a main tap water inlet pipe. The valve is ordinarily opened. Once the tap water pipe is leaking, the small impeller of the water meter will be rotated by the water flow. The water meter further pushes the counter in the water meter to count the rate of the water flow. People turn off the valve only when the maintenance is required or they will take a trip. In the circumstance that the valve is opened, the user forgot to turn off the faucet sometimes or the tap water pipe is leaking to cause loss of tap water. If there is no one at home, the articles in the house may immerse in water because the tap water pipe is leaking (burst). Accordingly, the inventor of the present invention has devoted himself based on his many years of practical experiences to solve these problems.

SUMMARY OF THE INVENTION

The primary object of the present invention is to provide a household tap water monitor to monitor the tap water pipe which may be leaking or burst.

The household tap water monitor of the present invention comprises a water meter and a valve which are connected in series between a tap water pipe and a main tap water inlet pipe. The household tap water monitor further comprises a single chip micyoco and a photoelectric detector. The valve is an electric control valve. The single chip micyoco has a first output port connected to a control port of the electrical control valve. The single chip micyoco has a second output port connected to a liquid crystal display. The single chip micyoco has a first input port connected to the photoelectric detector. The photoelectric detector is adapted to detect rotation of a small impeller of the water meter. The single chip micyoco has a second input port connected to a reset switch. An electrical source circuit supplies electricity to the single chip micyoco, the photoelectric detector, the liquid crystal display and the electrical control valve.

The household tap water monitor uses the photoelectric detector to detect rotation of the small impeller of the water meter. The photoelectric detector sends the detected signal to the single chip micyoco. The single chip micyoco normally controls the electrical control valve in an open state. When the single chip micyoco detects the rate of the water flow corresponding to the number of rotation of the small impeller is greater than a predetermined rate of the minimum water flow, namely, there is water flow in the tap water pipe, the single chip micyoco starts countdown from a predetermined time (for example one hour) of the maximum water flow. When the small impeller of the water meter stops rotation or the corresponding rate of the water flow is less than the predetermined rate of the minimum water flow, namely, there is no water flow, the numeric of the countdown of the single chip micyoco is greater than zero, after the single chip micyoco waits for a predetermined period of time (for example 15 seconds), the numeric of the countdown returns to the predetermined time of the maximum water flow for next use to monitor water leakage or burst pipe. If the numeric of the countdown of the single chip micyoco is equal to zero and the small impeller of the water meter continually turns and the corresponding rate of the water flow is greater than the predetermined rate of the minimum water flow, the single chip micyoco controls the electrical control valve to shut down for the main tap water inlet pipe to stop supplying water to the tap water pipe, the single chip micyoco activates the liquid crystal display to send an alarm of water leakage until the single chip micyoco detects that someone presses the reset switch. The single chip micyoco controls the electrical control valve to be opened again and turns off the warning of water leakage of the liquid crystal display. The numeric of the countdown returns to the predetermined time of the maximum water flow for next use to monitor water leakage or burst pipe. When the single chip micyoco detects the rate of the water flow corresponding to the rotation of the small impeller of the water meter is greater than the predetermined rate of the maximum water flow, namely, the tap water pipe is burst, the single chip micyoco controls the electrical control valve to shut down for the main tap water inlet pipe to stop supplying water to the tap water pipe, the single chip micyoco activates the liquid crystal display to send an alarm of burst pipe until the single chip micyoco detects that someone presses the reset switch. The single chip micyoco controls the electrical control valve to be opened again and turns off the warning of burst pipe of the liquid crystal display. The numeric of the countdown returns to the predetermined time of the maximum water flow for next use to monitor water leakage or burst pipe. The user can input signals to the single chip micyoco through a keyboard to set the working mode or to reset the parameters for the predetermined time of the maximum water flow, the rate of the minimum water flow and the rate of the maximum water flow.

The electrical control valve comprises a deceleration gear unit, an electric motor, an option device and a faucet valve. The first output port the single chip micyoco is connected to a control port of the electric motor. The deceleration gear unit comprises a spiral rod, a worm gear and a short small gear wheel installed on a first axle, a middle gear wheel and a long small gear wheel installed on a second axle, a big gear wheel installed on a lower portion of an output axle. The spiral rod installed on a rotation axle of the electric motor meshes with the worm gear. The long small gear wheel on the second axle meshes with the big gear wheel on the output axle. The option device comprises a spring fitted on an upper portion of the second axle and an option knob having insertion legs installed on an upper end of the second axle. The insertion legs of the option knob insert in corresponding insertion holes. The spring pushes the second axle to a lower position. The middle gear wheel on the second axle meshes with the short small gear wheel on the first axle. When the insertion legs of the option knob don't insert in the corresponding insertion holes, the second axle is at an upper lower position and the middle gear wheel on the second axle doesn't mesh with the short small gear wheel on the first axle anymore. The output axle is connected with a valve axle of the faucet valve. The insertion legs of the option knob of the option device of this electric control valve are inserted in the corresponding insertion holes. The faucet valve is driven to open or close by electricity. If necessary, the option device may be changed to a manual state for the insertion legs of the option knob to disengage from the insertion holes. The output axle is turned manually to open and close the faucet valve. The configuration of the operation device is convenient for operation to prevent it from breaking down because of a power failure.

An adjustment pipe is provided between a water inlet pipe of the water meter and a water outlet of the faucet valve. The lower housing has a front portion provided with a ring, a middle portion formed with a battery chamber and a rear portion formed with a chamber. The upper housing has a front portion provided with a water meter sleeve, a middle portion provided with a battery top board and a rear portion provided with a chamber top board. A dial portion of the water meter is inserted in the ring of the lower housing and the water meter sleeve of the upper housing. A fixture holds the water meter and connects the water meter with the lower housing. The electric motor, the deceleration gear unit and the output axle are installed in the chamber of the lower housing. The upper housing is coupled to the lower housing. The valve axle of the faucet valve extends upward into the chamber of the lower housing and inserts in a corresponding insertion hole of a lower end of the output axle. An upper end of the output axle inserts through an axle hole of the chamber top board of the upper housing and extends out of the upper housing for installation of a manual knob. An upper end of the second axle inserts through a through hole of the chamber top board of the upper housing and extends out of the upper housing for installation of the option knob. The liquid crystal display and the keyboard are disposed on the battery top board of the upper housing. The upper housing, the lower housing and the fixture are used to secure and protect each part so as to enhance the firmness, moisture-proof, reliability and appearance of the monitor and to operate and maintain conveniently.

The household tap water monitor of the present invention is installed between the existing household tap water pipe and the household main tap water inlet pipe. The single chip micyoco uses the photoelectric detector to detect the rotation of the small impeller of the water meter to identify water leakage through the statistics of the water flow time. When there is water leakage, the single chip micyoco controls the electrical control valve to stop water supply of the main tap water inlet pipe and controls the liquid crystal display to warn the user of water leakage. The single chip micyoco uses the photoelectric detector to detect the rotation of the small impeller of the water meter and to exam the water flow in the water meter to identify burst pipe. When the tap water pipe is burst, the single chip micyoco controls the electrical control valve to shut down for the main tap water inlet pipe to stop supplying water to the tap water pipe. At the same time, the single chip micyoco activates the liquid crystal display to warn the user of burst pipe until the single chip micyoco detects that someone presses the reset switch. The single chip micyoco controls the electrical control valve to be opened again. The monitor is compact and agile. One monitor can monitor the entire household tap water pipes, including underground pipes, wall-mounted pipes and faucets to automatically control water supply of the entire house and to prevent any damage caused by water leakage or burst pipe.

DETAILED DESCRIPTION OF THE PREFERRED EMBODIMENTS

Embodiments of the present invention will now be described, by way of example only, with reference to the accompanying drawings.

The household tap water monitor according to a first embodiment of the present invention comprises a water meter and an electrical control valve which are connected in series between a tap water pipe and a main tap water inlet pipe. The electric control valve is a solenoid valve which is controlled by a single chip micyoco (SCM).

Figure 1:
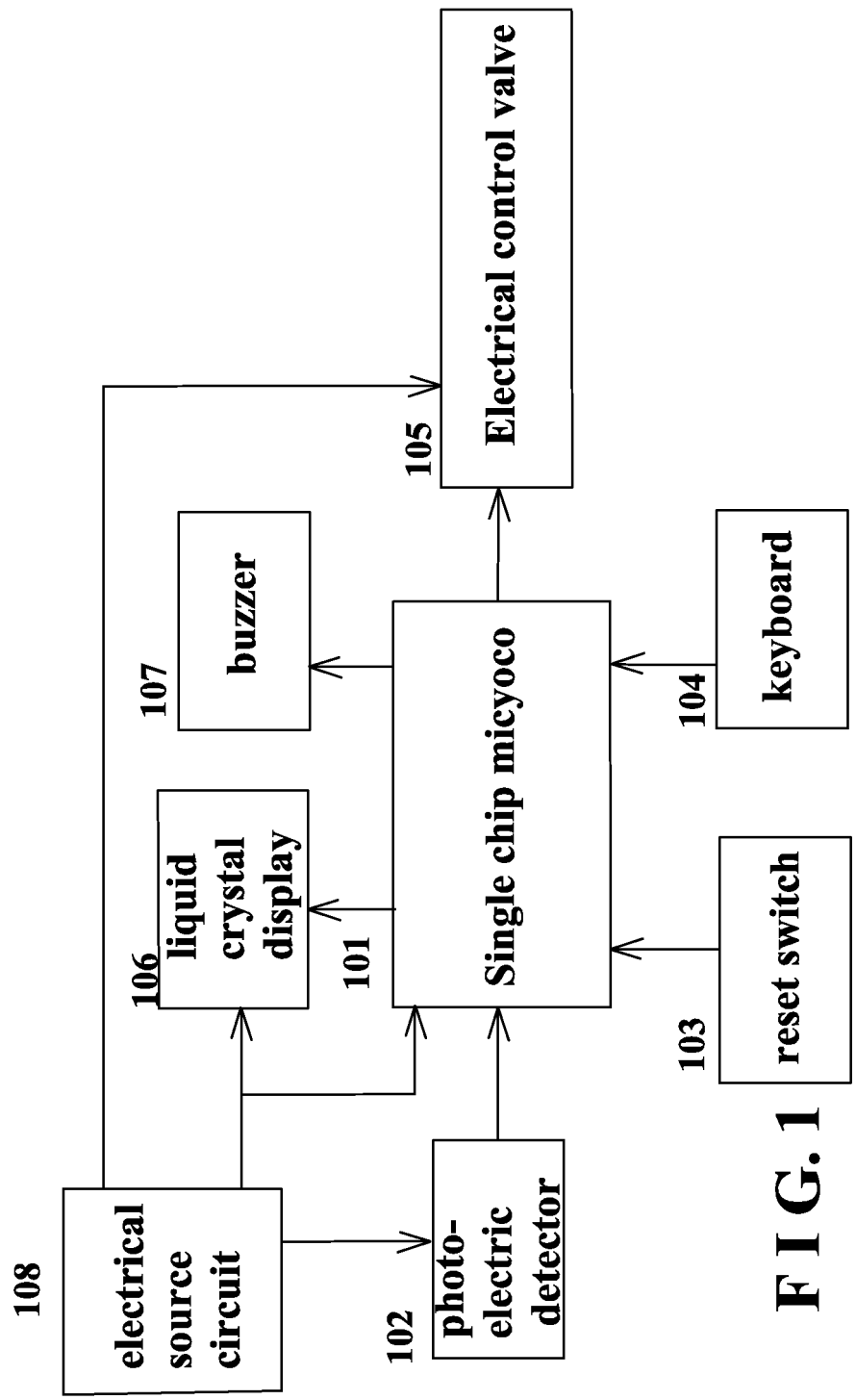
FIG. 1 is a diagram of the circuit of the household tap water monitor according to a first embodiment of the present invention.

FIG. 1 is a diagram of the circuit of this embodiment. The single chip micyoco 101 has a first input port connected to a photoelectric detector 102. The photoelectric detector 102 is used to detect the rotation of a small impeller in the water meter. The single chip micyoco 101 has a second input port connected to a reset switch 103. The single chip micyoco 101 has a third input port connected to a keyboard 104. The single chip micyoco 101 has a first output port connected to a control port of the electrical control valve 105. The single chip micyoco 101 has a second output port connected to a liquid crystal display (LCD) 106. The single chip micyoco 101 has a third output port connected to a buzzer 107. An electrical source circuit 108 is used to supply electricity to the single chip micyoco 101, the photoelectric detector 102, the liquid crystal display 106 and the electrical control valve 105.

The user can input signals to the single chip micyoco 101 by means of the keyboard 104 of this embodiment to set the working mode or to reset the parameters for the predetermined time of the maximum water flow, the rate of the minimum water flow and the rate of the maximum water flow.

For example, the user sets the working mode of this embodiment as "off" through the keyboard 104. The single chip micyoco 101 controls the electrical control valve 105 to shut off for preventing water leakage. The single chip micyoco 101 controls the liquid crystal display 106 to display "stop". The system is in an "off" state, and won't monitor the water flow of the tap water pipe.

Ordinarily, the working mode of this embodiment is "monitor". In this mode, the electrical control valve 105 is in an open state. The photoelectric detector 102 detects the rotation of the small impeller of the water meter. The photoelectric detector 102 sends the signal of this state to the single chip micyoco 101. When there is no water flow or water leakage, no water passes the water meter and the small impeller won't rotate. The output of the photoelectric detector 102 is stable low level. When there is water flow or water leakage, water passes the water meter to rotate the small impeller. The output signal of the photoelectric detector 102 is a pulse corresponding to the number of rotation of the small impeller. When the single chip micyoco 101 detects the rate of the water flow indicated by the pulse corresponding to the number of rotation of the small impeller is greater than the predetermined rate of the minimum water flow (namely, there is water flow in the tap water pipe), the single chip micyoco 101 starts countdown from the predetermined time (such as one hour or two hours) of the maximum water flow. When there is no water flow (namely, the single chip micyoco 101 receives the pulse outputted from the photoelectric detector 102 to indicate the corresponding rate of the water flow is less than the predetermined rate of the minimum water flow), the numeric of the countdown of the single chip micyoco 101 is greater than zero to show the use of water is normal. After the single chip micyoco 101 waits for a predetermined period of time (such as fifteen seconds or one minute), the numeric of the countdown returns to the predetermined time of the maximum water flow for next use to monitor water leakage or burst pipe. If the numeric of the countdown of the single chip micyoco 101 is equal to zero and there is water flow in the tap water (namely, the single chip micyoco 101 receives the pulse outputted from the photoelectric detector 102 to indicate the corresponding rate of the water flow is greater than the predetermined rate of the minimum water flow), the single chip micyoco 101 controls the electrical control valve 105 to shut down for the main tap water inlet pipe to stop supplying water to the tap water pipe. At the same time, the single chip micyoco 101 activates the liquid crystal display 106 and the buzzer 107 to warn the user of water leakage until the single chip micyoco 101 detects that someone presses the reset switch 103. The single chip micyoco 101 controls the electrical control valve 105 to be opened again and turns off the warning of water leakage of the liquid crystal display 106 and the buzzer 107. The numeric of the countdown returns to the predetermined time of the maximum water flow for next use to monitor water leakage or burst pipe.

In the "monitor" working mode, when the single chip micyoco 101 detects the rate of the water flow indicated by the pulse outputted from the photoelectric detector 102 is greater than the predetermined rate of the maximum water flow (namely, the tap water pipe is burst), the single chip micyoco 101 controls the electrical control valve 105 to shut down for the main tap water inlet pipe to stop supplying water to the tap water pipe. At the same time, the single chip micyoco 101 activates the liquid crystal display 106 and the buzzer 107 to warn the user of burst pipe until the single chip micyoco 101 detects that someone presses the reset switch 103. The single chip micyoco 101 controls the electrical control valve 105 to be opened again and turns off the warning of burst pipe of the liquid crystal display 106 and the buzzer 107. The numeric of the countdown returns to the predetermined time of the maximum water flow for next use to monitor water leakage or burst pipe.

The countdown of the single chip micyoco 101 can use "minute" or other counting unit.

FIG. 2 to FIG. 6 show the mechanical structure according to a second embodiment of the tap water monitor of the present invention. The tap water monitor comprises a water meter 1, a faucet valve 2, an adjustment pipe 3, a lower housing 4, a power module 5, an upper housing 6, a fixture 7, a battery 8, a circuit board 9 and a power source unit 10.

A water outlet pipe 12 of the water meter 1 is connected with household the tap water pipe. The water inlet end of the faucet valve 2 is connected with the main tap water inlet pipe. The front section of the adjustment pipe 3 has a counterclockwise outer threaded portion which is screwed to the counterclockwise inner threaded portion of a water inlet pipe 11 of the water meter 1. The rear section of the adjustment pipe 3 has a clockwise outer threaded portion which is screwed to the clockwise inner threaded portion of an outlet 22 of the faucet valve 2. The adjustment pipe 3 can be turned to adjust the distance between the water meter 1 and the faucet valve 2.

The lower housing 4 has a rear portion formed with a chamber 41 to accommodate the power module 5 and the power source unit 10, a middle portion formed with a battery chamber 42 to accommodate the battery 8, and a front portion provided with a ring 44. Two sides of the battery chamber 42 are respectively provided with a left lid 43 and a right lid 43' to lock a spare battery 8.

Figure 6:
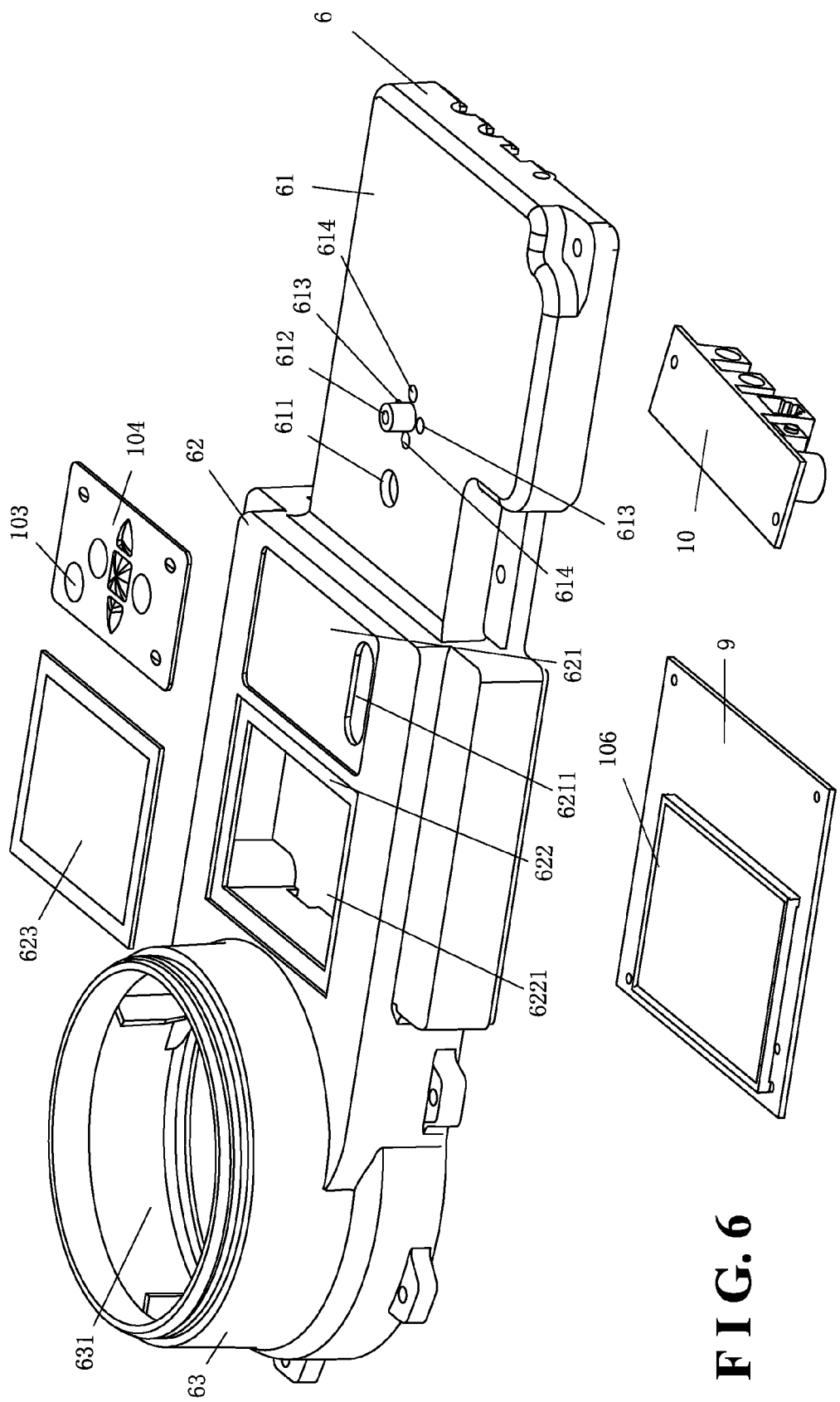
FIG. 6 is an exploded view showing the upper housing and the related parts of the embodiment as shown in FIG. 2.

The upper housing 6 corresponds to the lower housing 4. The upper housing 6 has a rear portion provided with a chamber top board 61, a middle portion provided with a battery top board 62, and a front portion provided with a water meter sleeve 63. The upper end of the water meter sleeve 63 of the upper housing 6 is provided with a water meter lid 65. Referring to FIG. 6, the chamber top board 61 has an axle hole 611 at a front central portion thereof and a protrusion having a through hole 612 at a rear portion thereof. Left and right sides of the protrusion respectively have a positioning recess 613. Front and rear sides of the protrusion respectively have an insertion hole 614. The battery top board 62 has a recess 621 at a rear portion to accommodate the keyboard 104 of the reset switch 103. One side of the recess 621 has a hole 6211 to guide the wire of the keyboard 104 into the inner side of the battery top board 62 to connect with the relative contact of the circuit board 9. The battery top board 62 has a trough 622 at a front portion thereof. The bottom of the trough 622 has a window 6221 to expose the liquid crystal display 106 of the circuit board 9. A transparent protection lid 623 is pressed in the trough 622 to protect the liquid crystal display 106. The water meter sleeve 63 is a hollow housing and has an inner space 631 to accommodate a dial portion 13 of the water meter 1.

The diagram of the circuit of this embodiment is identical to that of the first embodiment, referring to FIG. 1. The single chip micyoco 101 has the first input port connected to the photoelectric detector 102. The photoelectric detector 102 is used to detect the rotation of the small impeller in the water meter. The single chip micyoco 101 has the second input port connected to the reset switch 103. The single chip micyoco 101 has the third input port connected to the keyboard 104. The single chip micyoco 101 has the first output port connected to a control port of an electric motor 54 in the electrical control valve 105. The single chip micyoco 101 has the second output port connected to the liquid crystal display (LCD) 106. The single chip micyoco 101 has the third output port connected to the buzzer 107. The electrical source circuit 108 composed of a power source unit 10 and a battery 8 is used to supply electricity to the single chip micyoco 101, the photoelectric detector 102, the liquid crystal display 106 and the electric motor 54 in the electrical control valve 105.

The power source unit 10 of the electrical source circuit 108 is to convert alternating current into direct current. When there is an interruption of the alternating current, the power source circuit 107 will automatically switch to connect with the battery 8.

Figure 3:
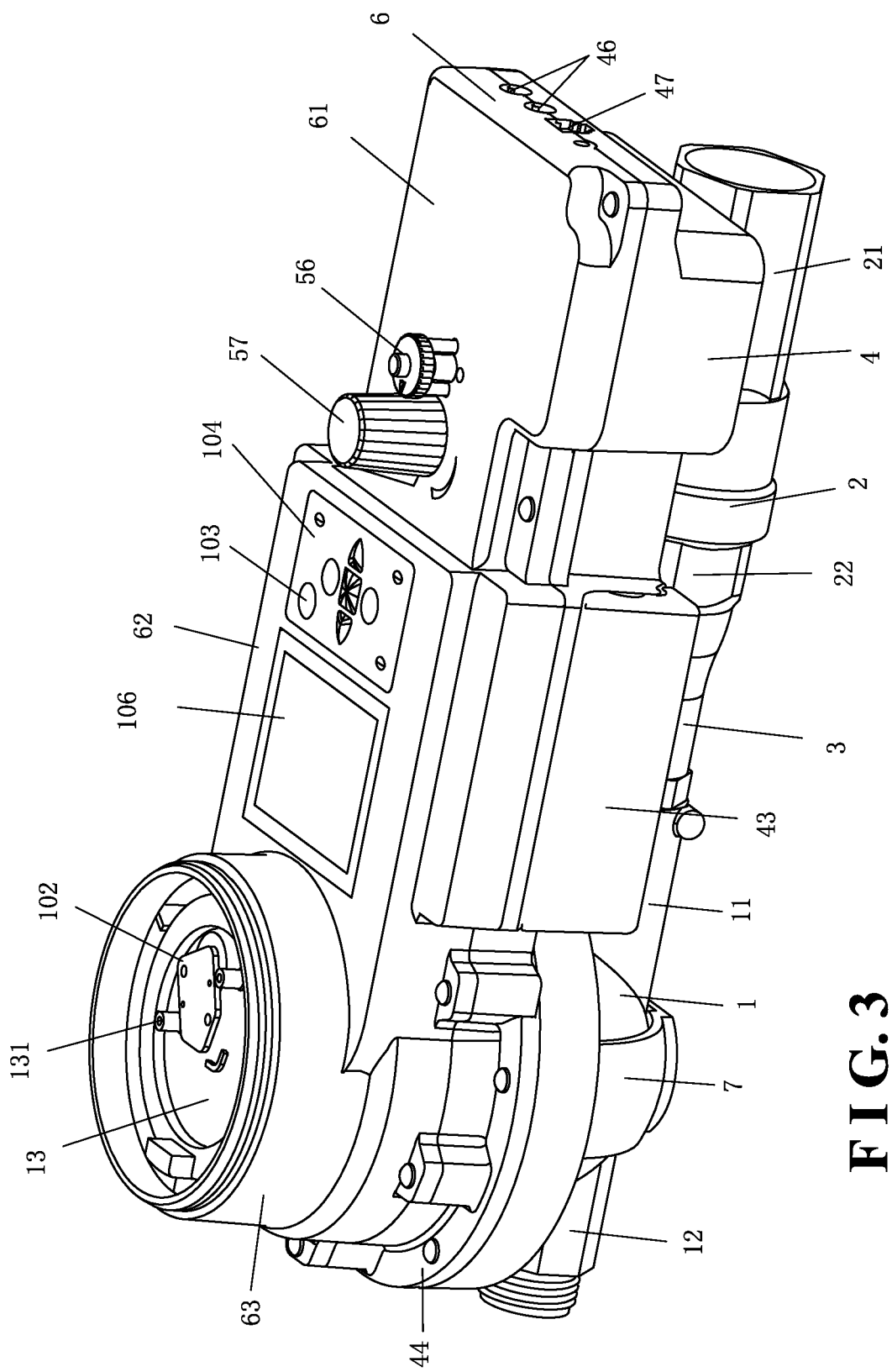
FIG. 3 is another perspective view of the embodiment as shown in FIG. 2.

Referring to FIG. 3, the photoelectric detector 102 is installed on two legs 131 of the dial portion 13 of the water meter 1 and located close to the small impeller.

The electrical control valve 105 of this embodiment comprises a deceleration gear unit 53, an electric motor 54, an option device and a faucet valve 2, and has both automatic and manual functions. The circuit board 9 has a driving circuit for the electric motor 54. The control port of the driving circuit can be deemed the control port of the electric port 54.

Figure 5:
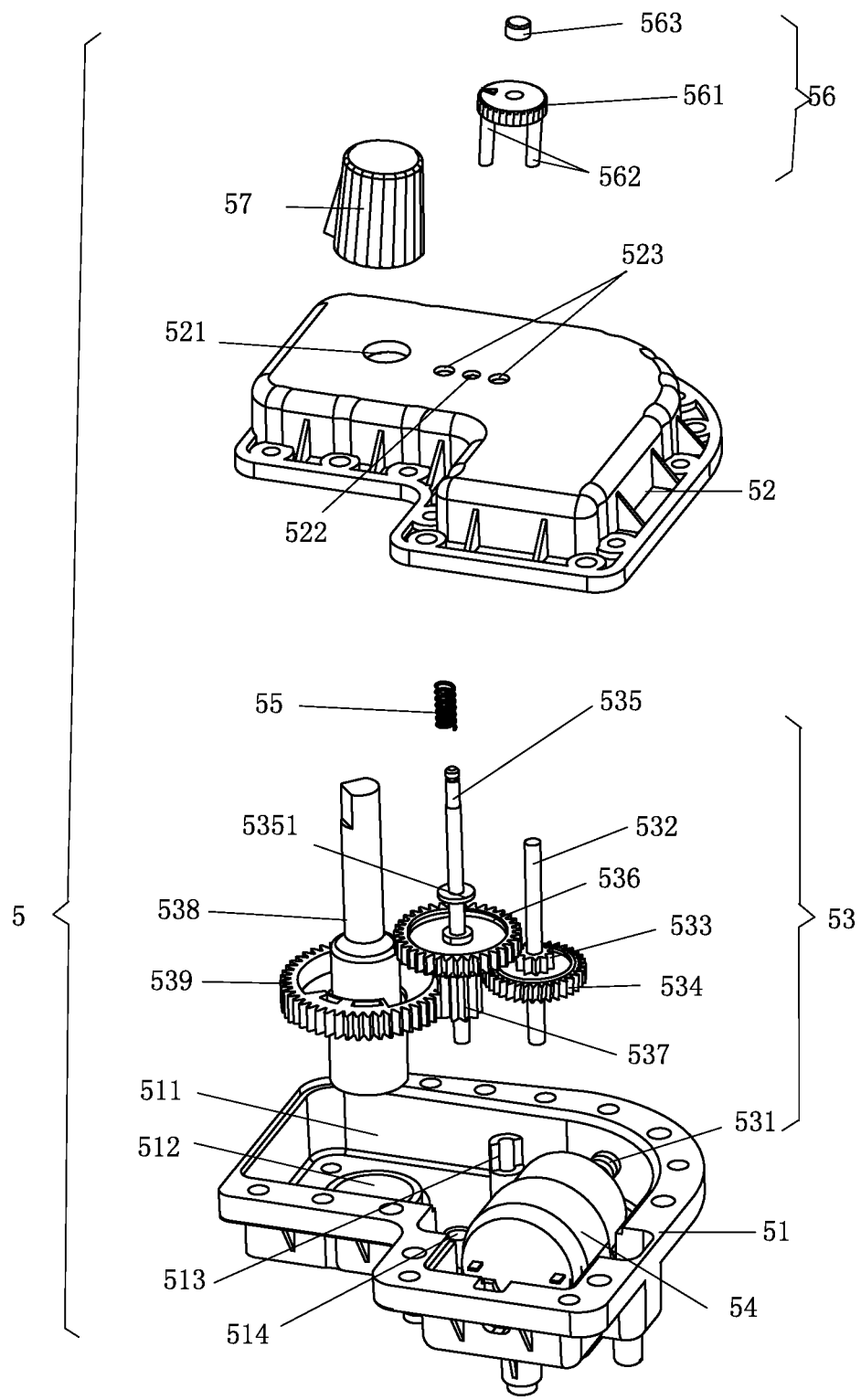
FIG. 5 is an exploded view showing the power module of the embodiment as shown in FIG. 2.

Referring to FIG. 5, the deceleration gear unit 53 and the electric motor 54 are installed in the space surrounded by the a lower casing 51 and an upper casing 52. The lower casing 51 has an open upper end with an inner chamber 511 in "L" shape.

The inner chamber 511 of the lower casing 51 has a reduced rear side and an axle hole 512 at the bottom thereof. The inner chamber 511 has axle seats 513, 514 extending upward from the central bottom thereof. The upper casing 52 corresponds to the lower casing 51. The top of the rear side of the upper casing 52 has an axle hole 521 corresponding to the axle hole 512 of the lower casing 51. The middle of the top of the upper casing 52 has an axle hole 522 corresponding to the axle seat 514 of the lower casing 51 and an axle seat extending downward and corresponding to the axle seat 513 of the lower casing 51. The top of the upper casing 52 has insertion holes 523 at two sides of the axle hole 522.

The deceleration gear unit 53 comprises a spiral rod 531, a worm gear 534 and a short small gear wheel 533 installed on a first axle 532, a middle gear wheel 536 and a long small gear wheel 537 installed on a second axle 535, a big gear wheel 539 installed on a lower portion of an output axle 538. The short small gear 533 is fixed at the middle of the first axle 532 and located above the worm gear 534. The middle gear wheel 536 is fixed near the middle of the second axle 535 and located above the long small gear wheel 537.

The spiral rod 531 is installed on the rotation axle of the electric motor 54. The electric motor 54 is transversely installed at the rear end of the inner chamber 511 of the lower casing 51. The lower end of the first axle 532 is inserted in the axle hole of the axle seat 513 inside the lower casing 51. The upper end of the first axle 532 is inserted in the axle hole of the corresponding axle seat 513 inside the upper casing 52. The spiral rod 531 meshes with the worm gear 534 on the first axle 532. The lower end of the second axle 535 is slidably inserted in the axle hole of the axle seat 514 inside the lower casing 51. The upper end of the second axle 535 is slidably inserted in the corresponding hole 522 of the upper casing 52 and extending out of the upper casing 52. The lower end of the output axle 538 is inserted in the axle hole 512 at the bottom of the lower casing 51. The upper end of the output axle 538 is inserted in the corresponding axle hole 521 of the upper casing 52 and extending out of the upper casing 52.

The second axle 535 has a flange 5351 at a middle portion thereof. A spring 55 is fitted on the upper end of the second axle 535. The lower end of the spring 55 is against the flange 5351 of the second axle 535. The upper end of the spring 55 is against the inner surface of the top of the upper casing 52. The spring 55 presses the second axle 535 downward for the middle gear wheel 536 on the second axle 535 to mesh with the short small gear wheel 533 on the first axle 532. No matter how the second axle 535 is moved up and down, the long small gear wheel 537 on the second axle 535 meshes with the big gear wheel 539 on the output axle 538 all along.

The power module 5 is installed in the chamber 41 of the lower housing 4.

Figure 2:
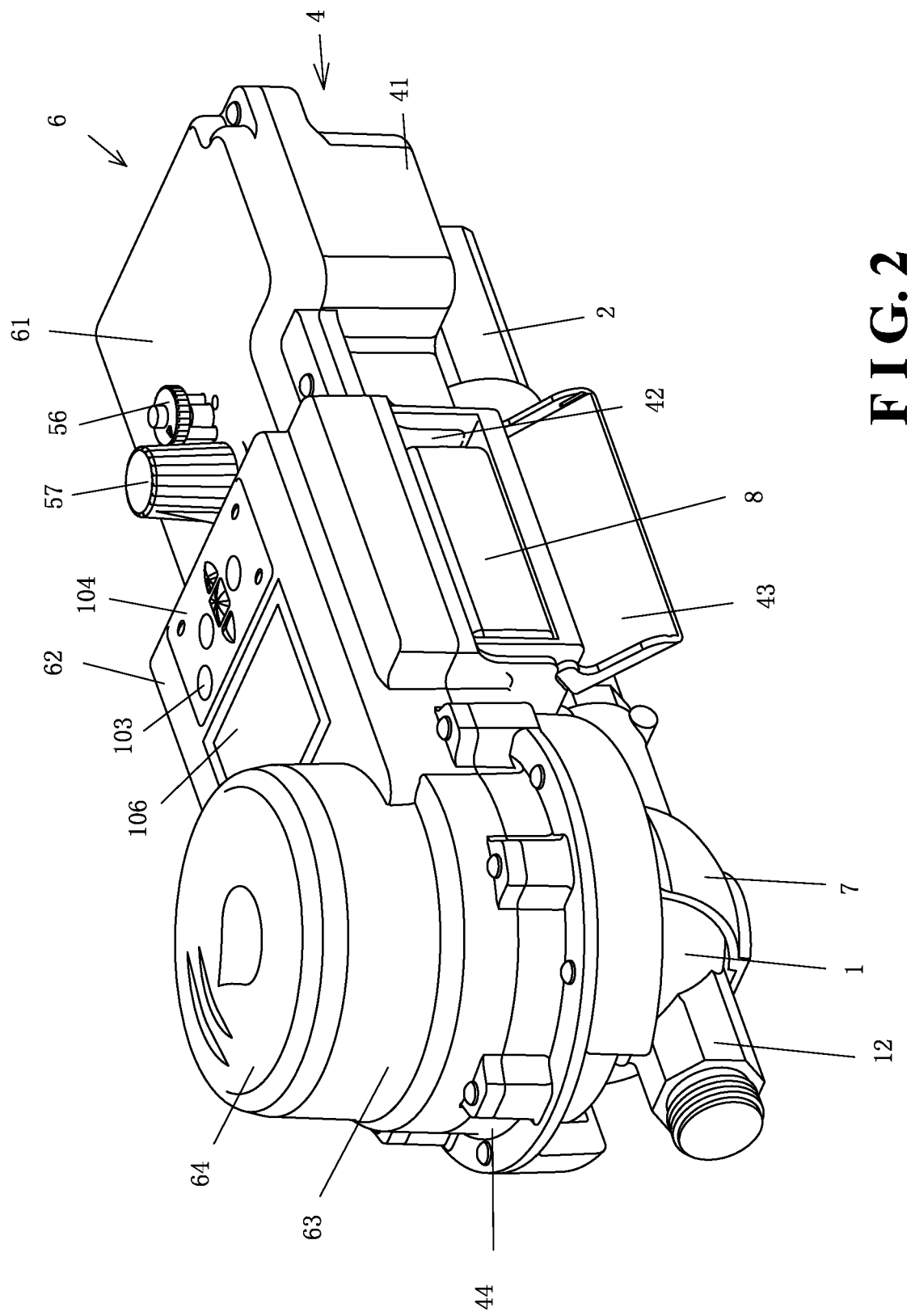
FIG. 2 is a perspective view of the household tap water monitor according to a second embodiment of the present invention.
Figure 4:
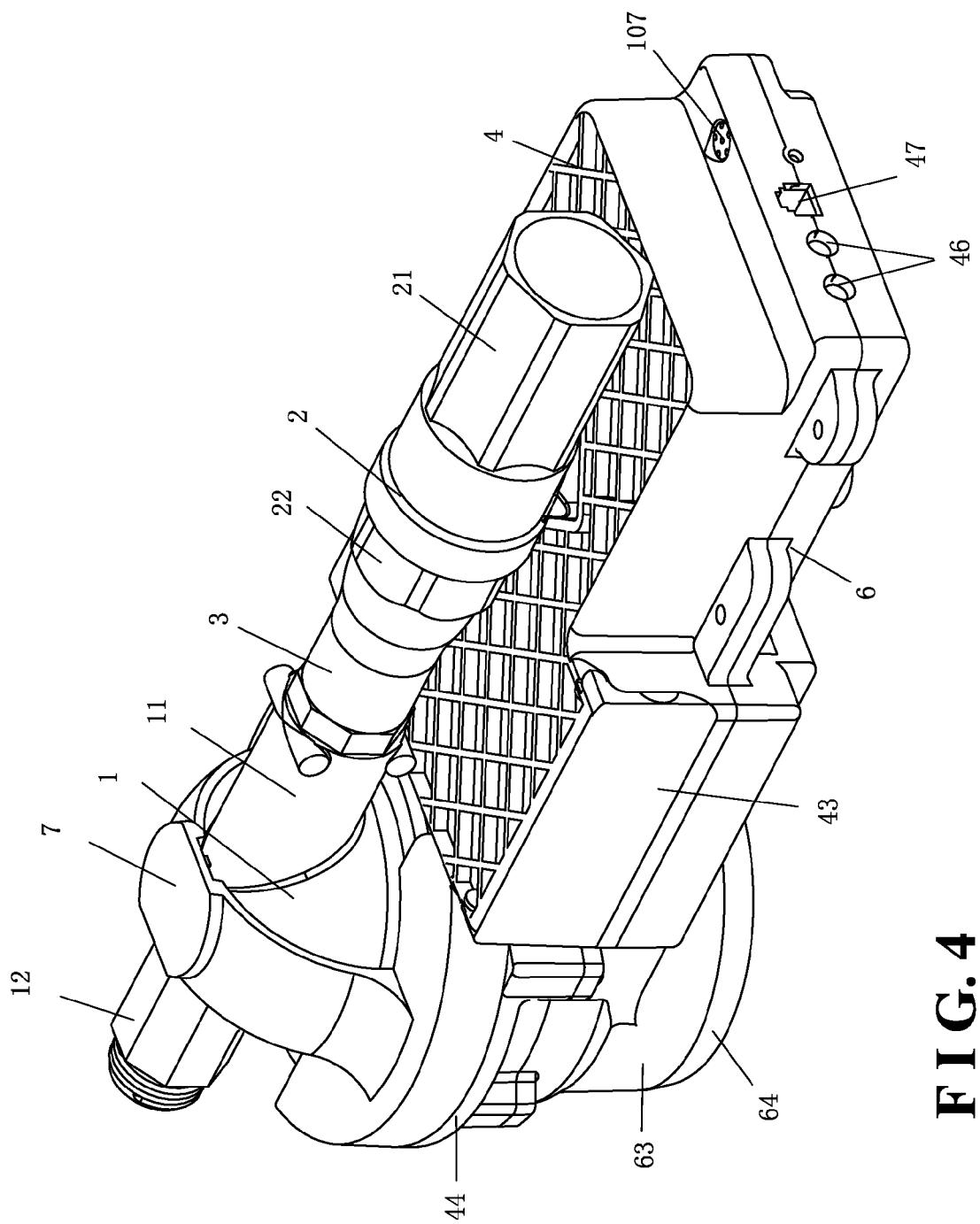
FIG. 4 is a rear perspective view of the embodiment as shown in FIG. 2.

Referring to FIG. 2, FIG. 3 and FIG. 4, the upper housing 6 is coupled to the lower housing 4. The dial portion 13 of the water meter 1 is inserted in the ring 44 of the lower housing 4 and the water meter sleeve 63 of the upper housing 6. The fixture 7 holds the water meter 1 and connects the water meter 1 with the lower housing 4. The valve axle 23 of the faucet valve 2 extends upward into the chamber 41 of the lower housing 4 and inserts in the corresponding insertion hole of the lower end of the output axle 538. The upper end of the output axle 538 inserts through the axle hole 611 of the chamber top board 61 of the upper housing 6 and extends out of the upper housing 6 for installation of a manual knob 57. The upper end of the second axle 535 inserts through the through hole 612 of the protrusion of the chamber top board 61 of the upper housing 6 and extends out of the upper housing 6 for installation of an option knob 56.

Referring to FIG. 5, the option knob 56 comprises a rotation disc 561. The rotation disc 561 has a pair of insertion leg 562 extending downward from two sides of the lower surface of the rotation disc 561. The rotation disc 561 has a central through hole. The upper end of the second axle 535 is inserted through the through hole of the rotation disc 561 and connected with a cap 563. The cap 563 keeps the rotation disc 561 to engage with the second axle 535.

The spring 55 and the option knob 56 constitute an automatic/manual option device.

Ordinarily, the two insertion legs 562 of the rotation disc 561 of the option knob 56 are inserted into the corresponding insertion holes 614 of the chamber top board 61 of the upper housing 6 and the corresponding insertion hole 523 of the top of the upper casing 52, respectively. The spring 55 pushes the second axle 535 to a lower position. The middle gear wheel 536 on the second axle 535 meshes with the short small gear wheel 533 on the first axle 532. The electric motor 54 drives the spiral rod 531 to turn. The spiral rod 531 brings the worm gear 534 and the first axle 532 to turn. The short small gear wheel 533 on the first axle 532 turns the middle gear 536, and the long small gear wheel 537 on the second axle 535 turns the big gear wheel 539 and the output axle 538. The electric motor 54 drives the faucet valve 2 to open or close automatically.

When it is necessary to operate the faucet valve 2 manually, the rotation disc 561 of the rotation knob 56 is pulled upward. The two insertion legs 562 of the rotation disc 561 are disengaged from the corresponding insertion holes 614 of the chamber top board 61 of the upper housing 6 and the corresponding insertion hole 523 of the top of the upper casing 52. The spring 55 is compressed for the rotation disc 561 to be turned 90 degrees. After that, the rotation disc 561 is released. The two insertion legs 562 of the rotation disc 561 are in the corresponding positioning recesses 613 of the chamber top board 61 of the upper casing 6. The second axle 535 is at an upper position. The middle gear wheel 536 on the second axle 535 doesn't mesh with the short small gear wheel 533 on the first axle 532. Even though the electric motor 54 drives the spiral rod 531 to turn, the spiral rod 531 will bring the worm gear 534 and the first axle 532 to turn. The short small gear wheel 534 on the first axle 532 is unable to turn the middle wheel gear 536 and the second axle 535, such that the electric motor 54 cannot drive the faucet valve 2 to open or close automatically. Only by turning the manual knob 57, the output axle 538 can be turned to drive the faucet valve 2 to be opened or closed manually.

Referring to FIG. 4, the lower housing 4 and the upper housing 6 have two wire holes 46 and a spare insertion hole 47 at the rear end surfaces thereof. The two wire holes 46 are for the AC input wires of the power source unit 10 of the electrical source circuit 108 to be guided out. The spare insertion hole 47 is for insertion of the I/O wire of the circuit board 9 if necessary.

The user can input signals to the single chip micyoco 101 by means of the keyboard 104 of this embodiment to set the working mode or to reset the parameters for the predetermined time of the maximum water flow, the rate of the minimum water flow and the rate of the maximum water flow.

Ordinarily, the rotation disc 561 of the option device is in an automatic state.

When the user sets the working mode of this embodiment as "off" through the keyboard 104, the single chip micyoco 101 controls the electric motor 54 of electrical control valve 105 to close the faucet valve 2 through the deceleration gear unit 53 in order to prevent water leakage. The single chip micyoco 101 also controls the liquid crystal display 106 to display "stop". The system is in an off state, and won't monitor the water flow of the tap water pipe.

In general, the working mode of this embodiment is "monitor". In this mode, the faucet valve 2 is in an open state. The photoelectric detector 102 detects the rotation of the small impeller of the water meter. The photoelectric detector 102 sends the signal of this state to the single chip micyoco 101. When there is no water flow or water leakage, no water passes the water meter and the small impeller won't rotate. The output of the photoelectric detector 102 is stable low level.

When there is water flow or water leakage, water passes the water meter to rotate the small impeller. The output signal of the photoelectric detector 102 is a pulse corresponding to the number of revolution of the small impeller.

When the single chip micyoco 101 detects the rate of the water flow indicated by the pulse corresponding to the number of rotation of the small impeller is greater than the predetermined rate of the minimum water flow, the single chip micyoco 101 starts countdown from the predetermined time (such as one hour or two hours) of the maximum water flow.

When the single chip micyoco 101 receives the pulse outputted from the photoelectric detector 102 to indicate the corresponding rate of the water flow is less than the predetermined rate of the minimum water flow, the numeric of the countdown of the single chip micyoco 101 is greater than zero to show the use of water is normal. After the single chip micyoco 101 waits for a predetermined period of time (such as fifteen seconds or one minute), the numeric of the countdown returns to the predetermined time of the maximum water flow for next use to monitor water leakage or burst pipe.

If the numeric of the countdown of the single chip micyoco 101 is equal to zero and the single chip micyoco 101 receives the pulse outputted from the photoelectric detector 102 to indicate the corresponding rate of the water flow is greater than the predetermined rate of the minimum water flow, the single chip micyoco 101 controls the electric motor 54 of the electrical control valve 105 to close the faucet valve 2 through the deceleration gear unit 53 for the main tap water inlet pipe to stop supplying water to the tap water pipe. At the same time, the single chip micyoco 101 activates the liquid crystal display 106 and the buzzer 107 to warn the user of water leakage until the single chip micyoco 101 detects that someone presses the reset switch 103. The single chip micyoco 101 turns off the warning of water leakage of the liquid crystal display 106 and the buzzer 107. The numeric of the countdown returns to the predetermined time of the maximum water flow for next use to monitor water leakage or burst pipe.

In the "monitor" working mode, when the single chip micyoco 101 detects the rate of the water flow indicated by the pulse outputted from the photoelectric detector 102 is greater than the predetermined rate of the maximum water flow (namely, the tap water pipe is burst), the single chip micyoco 101 controls the electric motor 54 of the electrical control valve 105 to close the faucet valve 2 through the deceleration gear unit 53 for the main tap water inlet pipe to stop supplying water to the tap water pipe. At the same time, the single chip micyoco 101 activates the liquid crystal display 106 and the buzzer 107 to warn the user of burst pipe until the single chip micyoco 101 detects that someone presses the reset switch 103. The single chip micyoco 101 turns off the warning of burst pipe of the liquid crystal display 106 and the buzzer 107. The numeric of the countdown returns to the predetermined time of the maximum water flow for next use to monitor water leakage or burst pipe.

The countdown of the single chip micyoco 101 can use "minute" or other counting unit.

When there is an interruption of the alternating current, the power source unit 10 will automatically switch to connect with the spare battery 8. After the alternating current is supplied again, the power source unit 10 supplies electricity to each part of this embodiment. The power source unit 10 can supply electricity to each part of this embodiment for 7 days. Before the battery 8 runs out, the single chip micyoco 101 will automatically detect that the voltage outputted from battery 8 is lowered. The single chip micyoco 101 will control the electric motor 54 to close the faucet valve 2 to prevent water leakage. This embodiment won't monitor the water flow anymore.

The household tap water monitor of the present invention is installed between the existing household tap water pipe and the household main tap water inlet pipe. The single chip micyoco uses the photoelectric detector to detect the rotation of the small impeller of the water meter to identify water leakage through the statistics of the water flow time. When there is water leakage, the single chip micyoco controls the electrical control valve to stop water supply of the main tap water inlet pipe and controls the liquid crystal display to warn the user of water leakage. The monitor is compact and agile. One monitor can monitor the entire household tap water pipes, including underground pipes, wall-mounted pipes and faucets to automatically control water supply of the entire house and to prevent any damage caused by water leakage or burst pipe.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A household tap water monitor comprising:
a water meter and a valve connected in series between a tap water pipe and a main tap water inlet pipe, with the valve being an electric control valve,
a single chip micyoco, having
a first output port connecting a control port of the electrical control valve,
a second output port connecting a liquid crystal display,
a first input port connecting a photoelectric detector,
a second input port connecting a reset switch, and
the photoelectric detector, adapted to detect rotation of an impeller in the water meter thereof,
an electrical source circuit powering the single chip micyoco,
the photoelectric detector,
the liquid crystal display, and
the electrical control valve,
wherein the electrical control valve comprises a deceleration gear unit, an electric motor, an option device and a faucet valve; the first output port the single chip micyoco being connected to a control port of the electric motor; the deceleration gear unit comprising a spiral rod, a worm gear and a gear wheel installed on a first axle, a middle gear wheel and a gear wheel installed on a second axle, a gear wheel installed on a lower portion of an output axle, the spiral rod installed on a rotation axle of the electric motor meshing with the worm gear, the gear wheel on the second axle meshing with the gear wheel on the output axle; the option device comprising a spring fitted on an upper portion of the second axle and an option knob having insertion legs installed on an upper end of the second axle; the insertion legs of the option knob inserting in corresponding insertion holes, the spring pushing the second axle to a lower position, the middle gear wheel on the second axle meshing with the gear wheel on the first axle; when the insertion legs of the option knob do not insert in the corresponding insertion holes, the second axle being at an upper lower position, the middle gear wheel on the second axle not meshing with the gear wheel on the first axle anymore; the output axle being connected with a valve axle of the faucet valve.

2. The household tap water monitor as claimed in claim 1, wherein an adjustment pipe is provided between a water inlet pipe of the water meter and a water outlet of the faucet valve; a lower housing having a front portion provided with a ring, a middle portion formed with a battery chamber and a rear portion formed with a chamber; an upper housing having a front portion provided with a water meter sleeve, a middle portion provided with a battery top board and a rear portion provided with a chamber top board; a dial portion of the water meter being inserted in the ring of the lower housing and the water meter sleeve of the upper housing, a fixture holding the water meter and connecting the water meter with the lower housing; the electric motor, the deceleration gear unit and the output axle being installed in the chamber of the lower housing; the upper housing being coupled to the lower housing, the valve axle of the faucet valve extending upward into the chamber of the lower housing and inserting in a corresponding insertion hole of a lower end of the output axle; an upper end of the output axle inserting through an axle hole of the chamber top board of the upper housing and extending out of the upper housing for installation of a manual knob; the upper end of the second axle inserting through a through hole of the chamber top board of the upper housing and extending out of the upper housing for installation of the option knob.

* * * * *